July 15, 1952
A. E. BOWEN
2,603,709
ROTATABLE WAVE GUIDE ATTENUATOR
Filed Dec. 11, 1946
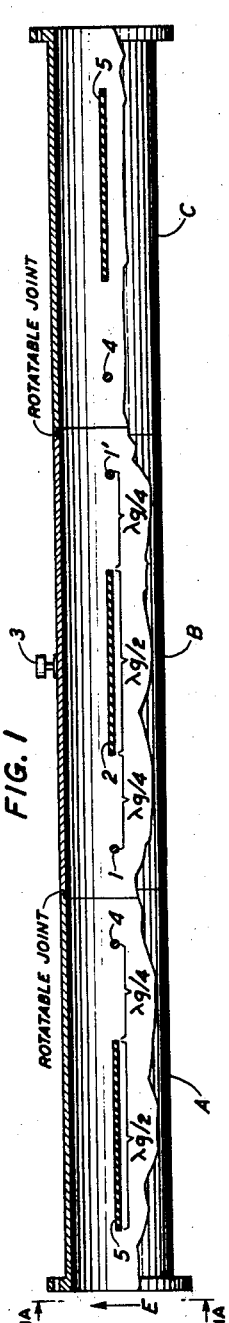
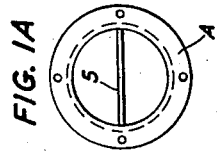
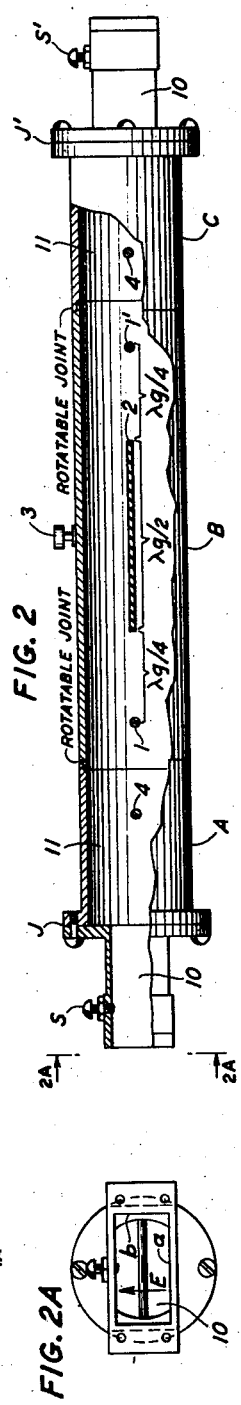
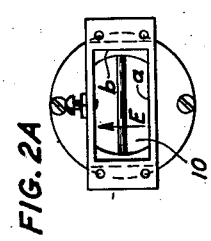
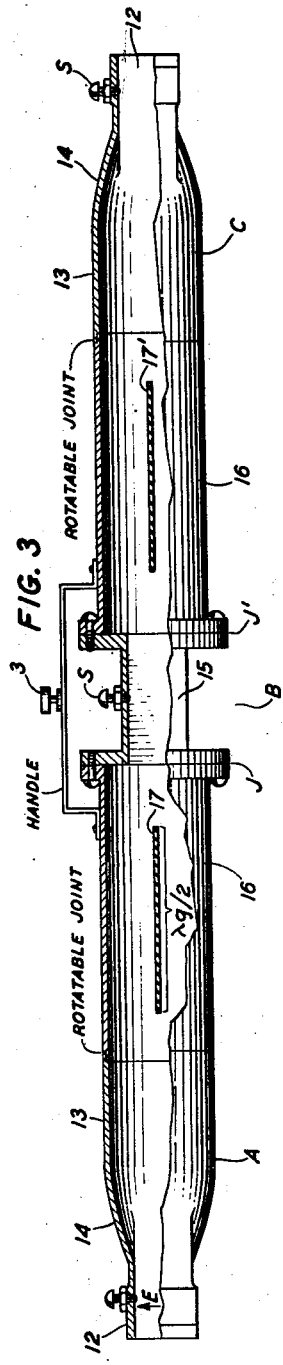
INVENTOR
A. E. BOWEN
BY
ATTORNEY Patented July 15, 1952

2,603,709

UNITED STATES PATENT OFFICE 2,603,709

ROTATABLE WAVE GUIDE ATTENUATOR

Arnold E. Bowen, Fair Haven, N. J., assignor to Bell Telephone Laboratories, Incorporated, New York, N. Y., a corporation of New York Application December 11, 1946, Serial No. 715,587

8 Claims. (Cl. 178—44)

This invention relates to variable wave guide attenuators.

An object of the invention is to attenuate electromagnetic waves by means of rotatable wave guide sections without altering the polarization direction.

Another object is to effectively suppress quadrature polarizations developed in rotatable wave guide attenuators.

A feature of the invention is a rotatable attenuator for linearly polarized waves, characterized by sections of wave guide provided with diametral absorber rods and conductive reflecting septa for enhancing the absorption of cross-components.

Another feature of the invention is a tapered impedance matching section between a rectangular and cylindrical wave guide.

Another feature of the invention is a quadrature polarization suppressor comprising a section of rectangular guide interposed between a pair of cylindrical pipe sections.

Referring to the figures of the drawing:

Fig. 1 shows a rotatable attenuator for bilateral or two-way transmission in accordance with the invention;

Fig. 1A is an end view thereof;

Fig. 2 represents a modification;

Fig. 2A is an end view thereof; and

Fig. 3 is another modification of the attenuator.

Rotatable wave guide attenuators, adapted to continuously attenuate an electromagnetic wave as a function of the angle of rotation $\theta$ of a wave guide section, without altering its polarization direction, have been disclosed in the United States application of A. E. Bowen, Serial No. 715,589, filed concurrently herewith. The attenuation $\alpha$ of the rotatable attenuator disclosed therein varies as a cosine squared function of the angle $\theta$.

In accordance with the teachings of the aforementioned Bowen application, a wave may be attenuated without altering the direction of its polarization, by means of relatively rotatable wave guide sections, provided with suppressors for quadrature polarizations.

In accordance with embodiments of the present invention, undesired cross-components and quadrature polarizations may be effectively suppressed in a rotatable attenuator by combinations of septa and terminating rod absorbers, or by polarization suppressive rectangular pipe sections.

In one exemplary embodiment thereof, the rotatable attenuator may comprise a rotatable section of wave guide B intermediate two stationary wave guide sections A, C, respectively, wherein the wave guide section B may be provided with a pair of spaced power absorbing rods placed symmetrically on opposite sides of a conductive, reflecting septum. The stationary guide sections A, C are provided with quadrature polarization suppressors, which may take various forms, such as polarizing sections of rectangular wave guide, combinations of septa and rods, or the like.

When guide sections A, B, C are oriented with absorbing rods and reflecting septa in a common plane perpendicular to the polarization of the incoming wave, a reference condition is established, characterized by zero attenuation.

As the rotatable section B is rotated through an angle $\theta$, the wave may be made to emerge from the system A, B, C with its amplitude reduced as a function of $\theta$, and with polarization direction unchanged. Components with quadrature polarizations existing before or arising during the rotation are extinguished by the suppressors, namely, the conductive septa and absorber rods, or the rectangular pipe suppressors in various combinations.

The attenuators A, B, C in accordance with the invention are by symmetry adapted for bilateral or two-way transmission, although for unilateral or one-way wave transmission, reduction of parts may be achieved by the omission of one of the stationary sections A, C.

A rotatable attenuator in accordance with an embodiment of the invention, is illustrated in Fig. 1, wherein a rotatable wave guide section B is coupled to a pair of stationary guide sections A, C, respectively, by means of the rotatable joints shown whereby waves propagated bilaterally may be attenuated without altering the direction of polarization.

The rotatable section B is a cylindrical pipe or wave guide section provided with a pair of diametral, absorber rods 1, 1', positioned a distance $$\frac{\lambda_g}{4}$$

on opposite sides of a conductive, coplanar reflecting septum 2 (where $\lambda_g$ is the wavelength in the guide). The conductive septum 2 is a thin, metallic plate, preferably $$\frac{\lambda_g}{2}$$

in length or greater, which acts as a perfect reflector for waves, polarized parallel to its plane. The handle 3 is for manually rotating guide section B relative to guide sections A, C.

The stationary guide sections A, C are each provided therein with a reflecting septum 5, identical to the septum 2, aforementioned, and spaced a distance $$\frac{\lambda_g}{4}$$

form a diametral absorber 4, which may be a resistance wire, or the like. In lieu of absorbing rods 1, 4, 1', attenuating plates as disclosed in the aforementioned Bowen application may be used.

The basic principle of operation of the rotatable attenuator, illustrated in Fig. 1 is essentially similar to that described in the aforementioned application of A. E. Bowen.

When the wave guide sections A, B, C are oriented with their attenuating rods and conductive septa coplanar, an incoming wave E with polarization perpendicular to the common plane, will pass freely through the system and emerge unaffected in its polarization vector and amplitude.

As the rotatable section B is rotated through an angle $\theta$ relative to the stationary sections A, C, the amplitude of the emergent wave E will be reduced as $\cos^2 \theta$ (as explained in greater detail in the aforementioned United States application of A. E. Bowen), with its polarization vector unchanged.

In the terminology of the explanatory vector diagrams disclosed therein, an incoming wave (E) will pass freely through section A, unaffected by septum 5 and absorber rod 4 therein, whose common plane is perpendicular thereto. In its passage through the rotated guide section B, the wave vector E may be considered as resolved into quadrature components $$E_1 = E \cos \theta \text{ and } E_{11} = E \sin \theta$$

with respect to the septum as described in the aforementioned Bowen application. The component $E_1$ passes freely through section B, while the parallel component $E_{11}$ is reflected by conductive septum 2 and fully absorbed by absorber rod 1. The other rod 1' acts similarly on a wave propagating in the opposite direction.

The component $E_1$, after its passage through guide section C, is likewise resolvable into two quadrature components. One component $$E' = E_1 \cos \theta$$

being perpendicular to the plane of septum 5 and absorber rod 4, passes freely thereover and emerges with the same direction of polarization as the input wave E. The other component being parallel to septum 5, is reflected thereby and absorbed by rod 4.

The relationship of the amplitude E' of the emergent wave and E of the input wave may be derived from $$E' = E_1 \cos \theta$$
$$E_1 = E \cos \theta$$

whereby $E' = E \cos^2 \theta$

The attenuation $$\alpha \text{ (in decibels)} = 20 \log_{10} \frac{E}{E'} = 20 \log_{10} \frac{1}{\cos^2 \theta}$$

The values of $\alpha$ vs. $\theta$ may be tabulated as follows:

| $\theta$ (degrees) | $\alpha$ |
| --- | --- |
| 0 | 0 |
| 10 | .26 |
| 20 | 1.08 |
| 30 | 2.50 |
| 40 | 4.62 |
| 50 | 7.65 |
| 60 | 12.04 |
| 70 | 18.65 |
| 75 | 23.5 |
| 80 | 30.4 |
| 90 | $\infty$ (>100 db) |

In summary, the effect of the rotatable attenuator A, B, C on an input wave E is to introduce a transmission loss therein proportional to $\cos^2 \theta$, where $\theta$ is the angle through which section B has been rotated. The direction of polarization of the emergent wave, after a discrete or a continuous rotation of section B, will be unchanged with reference to the input polarization of vector E.

The rotatable attenuator A, B, C disclosed in Fig. 1 operates bilaterally, producing by its symmetry the same effects on waves traveling in opposite directions. If unilateral transmission only, for example, from right to left, is desired, the attenuator can be simplified by the omission of guide section C and absorber rod 1.

In the rotatable attenuator A, B, C illustrated in Fig. 2, sections A, C each comprise a suitably proportioned section of rectangular guide 10 which replaces conductive septum 5 of Fig. 1 and an absorber rod 4 located in a round wave guide 11 joined to 10 at junction J. The rectangular guide 10 is so dimensioned as to transmit waves of the dominant wave polarization and to act as a cut-off for the quadrature polarization, i. e., $$a > \frac{\lambda}{2}$$

and $$b < \frac{\lambda}{2}$$

where $a$, $b$ are the sides of the rectangular cross-section (Fig. 2A) and $\lambda$ is the free space wavelength. Variable reactance screws S and S' are provided in the respective rectangular pipes 10 to compensate for impedance discontinuities at the junctions J, J', as disclosed in said concurrently filed Bowen application. Rotatable section B is identical with the corresponding B guide of Fig. 1.

The operation of the device (Fig. 2) is essentially similar to that described for Fig. 1—the rectangular guides 10 being incapable of transmitting cross-components or the quadrature polarizations. The input vector E will, however, freely pass through section A, be acted on by B and C as previously described, and emerge as $E' = E \cos^2 \theta$ and with its polarization vector parallel to E.

Another modification of the rotatable attenuator is shown in Fig. 3. In this form, suppression of the cross-components and quadrature polarizations is wholly by the cutoff-property of the rectangular pipes, as disclosed in connection with Fig. 2.

Stationary sections A, C of the rotatable attenuator A, B, C (Fig. 3) each comprise a rectangular wave guide 12 for passing the input wave E, with its polarization vector perpendicular to $a$, and a round wave guide 13 connected thereto by a tapered impedance matching transformer section 14.

The intermediate, rotatable section B comprises a piece of rectangular guide 15 joining together a pair of circular pipe sections 16, in which diametral attenuating plates 17, 17' with impedance matching terminals are fastened. Each of the attenuators 17—17' is of the structural type more fully disclosed in the United States applications of A. E. Bowen, Serial No. 486,013, filed May 7, 1943, now Patent No. 2,600,466, and W. H. Hewitt, Jr., Serial No. 551,040, filed August 24, 1944, with impedance matching terminals of notched or tapered form. The reactance screw S may be adjusted to compensate for impedance discontinuities at junctions J, J'.

The circular pipes 13 of sections A, C are connected by rotatable joints to the corresponding round pipes 16 of section B.

The operation of the embodiment, shown in Fig. 3 is as follows:

As previously explained, the rectangular guide 12 passes only polarizations perpendicular to its long side $a$ while quadrature polarizations are cut off. The section B, having been rotated through an angle $\theta$, permits a resolution of vector E into two components, $E_I$ and $E_{II}$, with respect to the plane of attenuating plates 17, 17'. $E_{II}$, which lies parallel to plate 17, is attenuated thereby, while $E_I$ passes freely thereover and through rectangular guide 15, which concomitantly cuts off and prevents the propagation of $E_{II}$.

Component $E_I$ also passes freely over attenuating plate 17' into section C, where it may be resolved into quadrature components.

One of these components, namely, E', which is perpendicular to a side $a$ of the output rectangular guide 12 (on C), emerges as the output wave, with polarization parallel to the original vector E but amplitude reduced to $E \cos^2 \theta$, where $\theta$ equals angle of rotation aforementioned. The other, which is a cross-component, is cut off by the action of the rectangular guide 12 of section C and thereby prevented from appearing in the output.

What is claimed is:

1. A rotatable attenuator comprising three wave guide sections, the intermediate section being rotatable and provided with a reflecting septum and a coplanar absorber rod.

2. A wave guide attenuator, comprising a rotatable section of wave guide, a conductive septum $$\frac{\lambda_s}{2}$$

in length therein adapted to freely pass waves of one polarization and reflect waves of the quadrature polarization, and a coplanar attenuator spaced $$\frac{\lambda_s}{4}$$

from said septum and adapted to absorb the quadrature polarization.

3. A wave guide attenuator comprising relatively rotatable wave guide sections, one thereof containing a conductive septum and a pair of coplanar attenuators symmetrically disposed with respect to and spaced from said septum whereby waves polarized parallel thereto may be extinguished.

4. A wave guide attenuator comprising three cylindrical wave guide sections, the intermediate one being relatively rotatable with respect to the end sections, each section being provided with a diametral reflecting septum and a coplanar absorber rod spaced therefrom, whereby waves polarized parallel thereto are suppressed.

5. An attenuator for microwaves comprising three wave guide sections, the intermediate wave guide section being rotatably connected to the end sections respectively, each wave guide end section having a polarizer for passing a desired polarization and suppressing the quadrature polarization, said sections adapted to be aligned to provide zero attenuation, an asymmetrical absorber in the intermediate section adapted to be rotated therewith whereby the amplitude of an input wave is attenuated as a function of the rotational position of said intermediate section, said polarization being unchanged in the attenuated wave.

6. The structure of claim 5, wherein the end sections are cylindrical pipes and the intermediate section contains a rectangular pipe adapted to pass waves polarized parallel to one face thereof and to cut off waves of the quadrature polarization.

7. The structure of claim 5, wherein each end section comprises a cylindrical pipe connected to its respective polarizer and a tapering impedance transformer between said pipe and polarizer.

8. The structure of claim 5, wherein the intermediate section is provided with a polarization suppressor comprising a rectangular pipe and said absorber comprises coplanar attenuators spaced on opposite sides thereof.

ARNOLD E. BOWEN.

REFERENCES CITED

The following references are of record in the file of this patent:

UNITED STATES PATENTS

| Number | Name | Date |
| --- | --- | --- |
| 2,088,749 | King | Aug. 3, 1937 |
| 2,106,768 | Southworth | Feb. 1, 1938 |
| 2,129,712 | Southworth | Sept. 13, 1938 |
| 2,197,122 | Bowen | Apr. 16, 1940 |
| 2,257,783 | Bowen | Oct. 7, 1941 |
| 2,407,267 | Ginzton | Sept. 10, 1946 |
| 2,423,130 | Tyrrell | July 1, 1947 |
| 2,423,383 | Hershberger | July 1, 1947 |
| 2,425,345 | Ring | Aug. 12, 1947 |
| 2,427,100 | Kihn | Sept. 9, 1947 |
| 2,433,368 | Johnson | Dec. 30, 1947 |
| 2,438,119 | Fox | Mar. 23, 1948 |

FOREIGN PATENTS

| Number | Country | Date |
| --- | --- | --- |
| 503,467 | Great Britain | Apr. 6, 1939 |

OTHER REFERENCES

Proceedings of the I. R. E., October 1946, page 783.